United States Patent
Gao et al.

(10) Patent No.: US 10,670,162 B2
(45) Date of Patent: Jun. 2, 2020

(54) FLUID BYPASS VALVE WITH TEMPORARY FLOW CONTROL DEVICE TO PROVIDE INITIALLY OPENED FLUID CIRCUIT

(71) Applicant: GM GLOBAL TECHNOLOGY OPERATIONS LLC, Detroit, MI (US)

(72) Inventors: Xiujie Gao, Troy, MI (US); Nicholas W. Pinto, Shelby Township, MI (US); Scott R. Webb, Macomb Township, MI (US); Nilesh D. Mankame, Ann Arbor, MI (US); Richard J. Skurkis, Lake Orion, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 152 days.

(21) Appl. No.: 15/485,285

(22) Filed: Apr. 12, 2017

(65) Prior Publication Data

US 2018/0299023 A1    Oct. 18, 2018

(51) Int. Cl.
| | |
|---|---|
| *F16K 31/00* | (2006.01) |
| *F16K 11/044* | (2006.01) |
| *F03G 7/06* | (2006.01) |
| *F16H 57/04* | (2010.01) |
| *B60H 1/14* | (2006.01) |

(52) U.S. Cl.
CPC ............ *F16K 31/002* (2013.01); *F03G 7/065* (2013.01); *F16H 57/0413* (2013.01); *F16K 11/044* (2013.01); *B60H 1/14* (2013.01)

(58) Field of Classification Search
CPC ......... F16K 31/42; F16K 31/40; B60H 1/039; B60H 1/03; B60H 1/14
See application file for complete search history.

(56) References Cited

U.S. PATENT DOCUMENTS

| 2,075,816 A | * | 4/1937 | Loepsinger | ............ | A62C 37/12 |
| | | | | | 169/39 |
| 6,427,712 B1 | | 8/2002 | Ashurst | | |

(Continued)

FOREIGN PATENT DOCUMENTS

| CN | 2090904 U | 12/1991 |
| CN | 2133729 Y | 5/1993 |

(Continued)

*Primary Examiner* — Ljiljana V. Ciric
*Assistant Examiner* — Alexis K Cox
(74) *Attorney, Agent, or Firm* — Quinn IP Law (57) ABSTRACT

A fluid bypass valve includes a valve member disposed within a valve chamber of a housing. A temperature based actuating mechanism moves the valve member between a first position and a second position in response to a temperature change. A temporary flow control device undergoes a one-time only shape change between a first shape and a second shape. The temporary flow control device enables fluid communication between a first port and a second port when exhibiting the first shape, and does not enable fluid communication between the first port and the second port when exhibiting the second shape. The temporary flow control device exhibits the first shape when having an initial temperature less than or equal to a second pre-defined temperature, and exhibits the second shape in response to a first heating of the temporary flow control device to a temperature that is greater than the second pre-defined temperature.

10 Claims, 9 Drawing Sheets

(56) References Cited

U.S. PATENT DOCUMENTS

| | | | |
|---|---|---|---|
| 2005/0199845 A1* | 9/2005 | Jones | F16K 15/031 251/129.06 |
| 2008/0185541 A1* | 8/2008 | Ukpai | F16H 57/0447 251/11 |
| 2009/0101354 A1* | 4/2009 | Holmes | E21B 43/32 166/373 |
| 2010/0122735 A1* | 5/2010 | Schramm | F16K 17/1613 137/68.19 |
| 2011/0046861 A1* | 2/2011 | Moriyama | F16D 48/066 701/67 |
| 2014/0117262 A1* | 5/2014 | Deperraz | F16K 31/025 251/11 |

FOREIGN PATENT DOCUMENTS

| | | |
|---|---|---|
| CN | 2859113 Y | 1/2007 |
| CN | 101000099 A | 7/2007 |
| CN | 204042104 U | 12/2014 |
| KR | 20140111452 A | 9/2014 |

\* cited by examiner

FLUID BYPASS VALVE WITH TEMPORARY FLOW CONTROL DEVICE TO PROVIDE INITIALLY OPENED FLUID CIRCUIT

INTRODUCTION

The disclosure generally relates to a temperature based fluid bypass valve assembly, and more specifically to a fluid bypass valve assembly for a transmission fluid cooling circuit.

Some fluid circuits will include a temperature based fluid bypass valve to open or close fluid communication in a fluid circuit based on a temperature of the fluid. For example, a transmission fluid cooling circuit of a vehicle may include a fluid bypass valve that opens and closes fluid communication between a transmission and a fluid cooler, based on a temperature of the transmission fluid circulating through the fluid bypass valve. When the temperature of the transmission fluid is less than a first pre-defined temperature, the fluid bypass valve closes fluid communication between the transmission and the fluid cooler, thereby allowing the transmission fluid to warm up quickly. When the temperature of the transmission fluid increases to a temperature greater than the first pre-defined temperature, the fluid bypass valve opens fluid communication between the transmission and the fluid cooler to cool the transmission fluid. In transmission fluid cooling circuits, the first pre-defined temperature at which the fluid bypass valve opens is typically around 85° C.

Accordingly, when the temperature of the transmission fluid is less than the first pre-defined temperature, such as during assembly of the vehicle and/or initial filling of the fluid circuit, the fluid bypass valve is normally closed, i.e., is positioned to close fluid communication between the transmission and the fluid cooler. This prevents the transmission fluid from circulating through the fluid bypass valve, and the portions of the fluid circuit downstream of the fluid bypass valve, during the initial filling of the fluid circuit.

SUMMARY

A fluid bypass valve is provided. The fluid bypass valve includes a housing defining a first port, a second port, and a valve chamber. A valve member is disposed within the valve chamber. The valve member is moveable between a first position and a second position. When in the first position, the valve member closes fluid communication between the first port and the second port. When in the second position, the valve member opens fluid communication between the first port and the second port. A temperature based actuating mechanism is coupled to the valve member. The temperature based actuating mechanism is operable to position the valve member in the first position when a temperature of a fluid circulating through the housing is equal to or less than a first pre-defined temperature. The temperature based actuating mechanism is operable to position the valve member in the second position when the temperature of the fluid circulating through the housing is greater than the first pre-defined temperature. A temporary flow control device is operable to undergo a one-time only shape change between a first shape and a second shape. When in the first shape, the temporary flow control device enables fluid communication between the first port and the second port. When in the second shape, the temporary flow control device does not enable fluid communication between the first port and the second port. The temporary flow control device exhibits the first shape when having an initial temperature less than or equal to a second pre-defined temperature. The temporary flow control device exhibits the second shape in response to a first heating of the temporary flow control device to a temperature that is greater than the second pre-defined temperature.

In one aspect of the fluid bypass valve, the housing includes a bypass passage, which interconnects the first port and the second port in fluid communication. The temporary flow control device is disposed within the bypass passage. The temporary flow control device allows fluid flow through the bypass passage when the temporary flow control device exhibits the first shape. The temporary flow control device blocks fluid flow through the bypass passage when the temporary flow control device exhibits the second shape.

In another aspect of the fluid bypass valve, the temporary flow control device interferes with one of the valve member or the temperature based actuating mechanism, when the temporary flow control device exhibits the first shape, to prevent movement of the valve member into the first position.

In one aspect of the fluid bypass valve, the temporary flow control device interferes with movement of the valve member into the first position when the temporary flow control device exhibits the first shape. The temporary flow control device does not interfere with movement of the valve member into the first position when the temporary flow control device exhibits the second shape. The valve member includes a seat, and the housing includes a land positioned to mate with the seat in sealing engagement when the valve member is disposed in the first position.

In one aspect of the fluid bypass valve, the temporary flow control device is disposed between the seat and the land when the temporary flow control device exhibits the first shape. The temporary flow control device is not disposed between the seat and the land when the temporary flow control device exhibits the second shape.

In another aspect of the fluid bypass valve, the temporary flow control device spaces the seat from the land to prevent sealing engagement therebetween when the temporary flow control device exhibits the first shape. The temporary flow control device forms at least part of the land when the temporary flow control device exhibits the second shape.

In one aspect of the fluid bypass valve, the temporary flow control device interferes with an operating position of the temperature based actuating mechanism when the temporary flow control device exhibits the first shape. The temporary flow control device does not interfere with the operating position of the temperature based actuating mechanism when the temporary flow control device exhibits the second shape.

In one aspect of the fluid bypass valve, the temperature based actuating mechanism includes a first biasing device operable to bias the valve member in a first direction along a central axis, and a second biasing device operable to bias the valve member in a second direction along the central axis. The first direction and the second direction are opposite directions along the central axis. The temporary flow control device spaces the first biasing device in the first direction along the central axis relative to a datum when the temporary flow control device exhibits the first shape. The temporary flow control device does not space the first biasing device relative to the datum, when the temporary flow control device exhibits the second shape.

In another aspect of the fluid bypass valve, the first biasing device includes a leg portion, and the housing defines a first bore, with the leg portion at least partially disposed within the first bore. The temporary flow control device is positioned within the first bore and interferes with a position of the leg portion within the first bore when the temporary flow control device exhibits the first shape. The temporary flow control device does not interfere with a position of the leg portion within the first bore when the temporary flow control device exhibits the second shape.

In another aspect of the fluid bypass valve, the housing includes a second bore intersecting the first bore. The second bore is positioned to form an angle between the first bore and the second bore. The temporary flow control device is completely disposed within the first bore when the temporary flow control device exhibits the first shape. The temporary flow control device is at least partially disposed within the second bore when the temporary flow control device exhibits the second shape.

In one aspect of the disclosure, the temporary flow control device includes a polymer. In another aspect of the disclosure, the temporary flow control device includes a shape memory polymer.

A transmission fluid circuit is also provided. The transmission fluid circuit includes a transmission, a fluid cooler, and a fluid bypass valve assembly. The transmission, the fluid cooler, and the fluid bypass valve assembly are disposed in fluid communication with each other to define a fluid circuit, for circulating a fluid through the transmission, the fluid cooler, and the fluid bypass valve assembly in a continuous loop. The fluid bypass valve assembly includes a housing defining a first port, a second port, and a valve chamber. A valve member is disposed within the valve chamber. A temperature based actuating mechanism is coupled to the valve member. The temperature based actuating mechanism is operable to position the valve member in a first position when a temperature of a fluid circulating through the housing is equal to or less than a first pre-defined temperature. The temperature based actuating mechanism is operable to position the valve member in a second position when the temperature of the fluid circulating through the housing is greater than the first pre-defined temperature. A temporary flow control device includes a shape memory polymer that is operable to undergo a one-time only shape change between a first shape and a second shape. The temporary flow control device is operable to enable fluid communication between the first port and the second port when exhibiting the first shape. The temporary flow control device does not enable fluid communication between the first port and the second port when exhibiting the second shape. The temporary flow control device exhibits the first shape when having an initial temperature less than or equal to a second pre-defined temperature. The temporary flow control device exhibits the second shape in response to a first heating of the temporary flow control device to a temperature that is greater than the second pre-defined temperature.

In one aspect of the fluid circuit, the temporary flow control device interferes with one of the valve member or the temperature based actuating mechanism, when the temporary flow control device exhibits the first shape, to prevent movement of the valve member into the first position.

In another aspect of the fluid circuit, the valve member includes a seat, and the housing includes a land positioned to mate with the seat in sealing engagement when the valve member is disposed in the first position. The temporary flow control device spaces the seat from the land to prevent sealing engagement therebetween when the temporary flow control device exhibits the first shape. The temporary flow control device forms at least part of the land when the temporary flow control device exhibits the second shape.

Accordingly, during initial assembly of the fluid circuit, prior to fluid circulating through the fluid bypass valve at temperatures greater than the first pre-defined temperature at which the valve member moves between the first position and the second position, the temporary flow control device enables fluid communication between the first port and the second port, thereby allowing the fluid to circulate through the entire fluid circuit, even though the fluid is at a temperature less than the first pre-defined temperature when the fluid bypass valve normally closes fluid communication between the first port and the second port. This enables the inspection of the entire fluid circuit during initial assembly and filling of the fluid circuit. Once the fluid is heated to a temperature equal to or greater than the second pre-defined temperature, the temporary flow control device transforms shapes, thereby allowing the fluid bypass valve to operate normally.

The above features and advantages and other features and advantages of the present teachings are readily apparent from the following detailed description of the best modes for carrying out the teachings when taken in connection with the accompanying drawings.

DETAILED DESCRIPTION

Those having ordinary skill in the art will recognize that terms such as "above," "below," "upward," "downward," "top," "bottom," etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may be comprised of any number of hardware, software, and/or firmware components configured to perform the specified functions.

Figure 1:
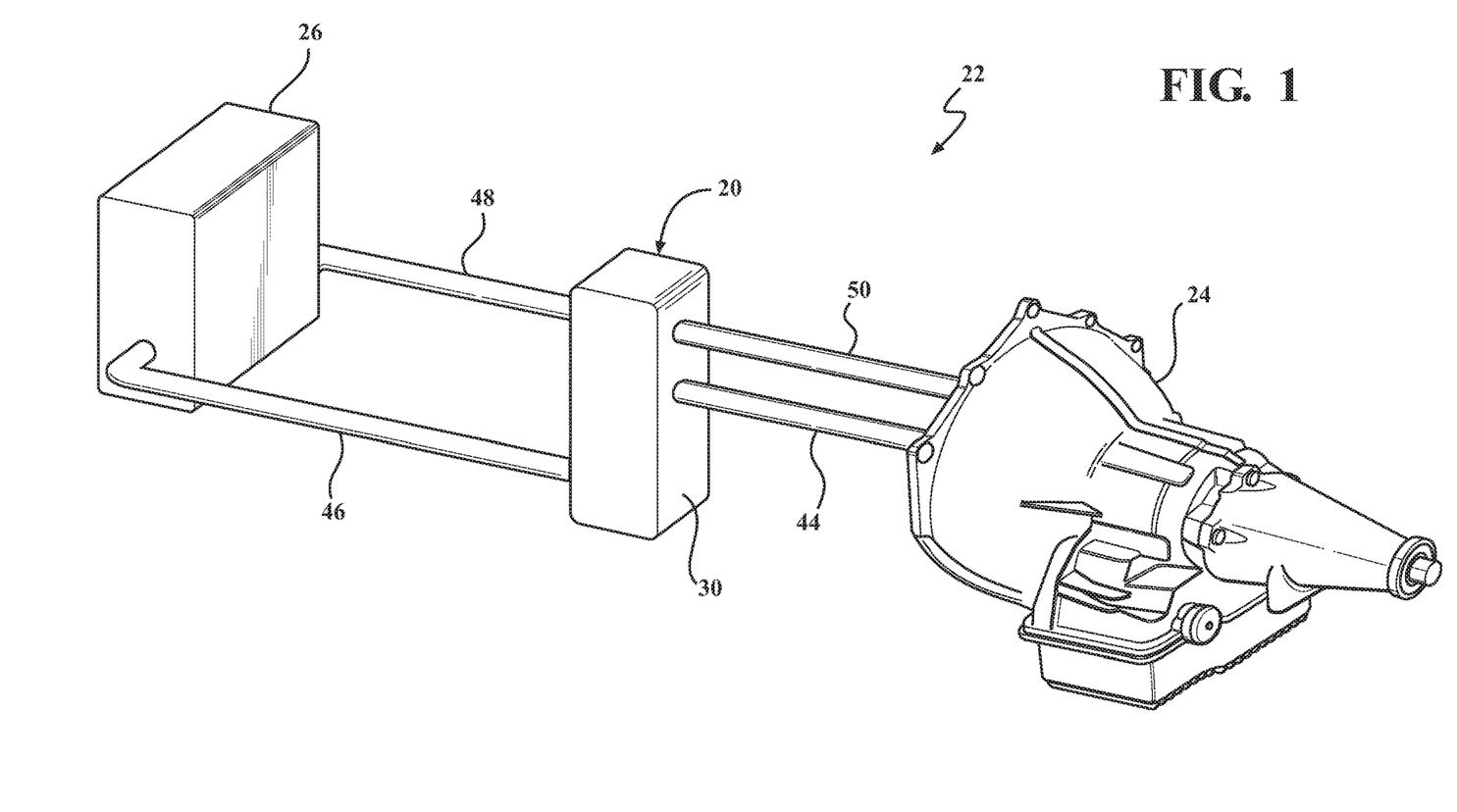
FIG. 1 is a schematic plan view of a fluid cooling circuit for a transmission of a vehicle.

Referring to the Figures, wherein like numerals indicate like parts throughout the several views, a bypass valve assembly is generally shown at 20. The bypass valve assembly is shown and described herein as part of a transmission fluid cooling circuit, which is generally shown in FIG. 1 at 22. However, it should be appreciated that the bypass valve assembly 20 may be utilized in other fluid circuits, and should not be limited to the exemplary description of the transmission fluid cooling circuit 22 described and shown herein.

Referring to FIG. 1, the transmission fluid cooling circuit 22 includes a transmission 24, a fluid cooler 26, and the bypass valve assembly 20. The transmission 24 may include any style and/or configuration of vehicular transmission 24 that circulates a fluid, hereinafter referred to as a transmission fluid, throughout for cooling and/or actuation and control of the transmission 24. While the exemplary aspects of the detailed description describes the transmission fluid cooling circuit 22 circulating transmission fluid, it should be appreciated that the fluid may include some other type of fluid when the bypass valve assembly 20 is used in a system other than the exemplary transmission fluid cooling circuit 22. The specific operation and configuration of the transmission 24 is not pertinent to the detailed description, and is therefore not described in detail herein. The fluid cooler 26 may include any heat exchanger capable of transferring heat from the transmission fluid to another medium, such as a flow of air that flows across and/or through the fluid cooler 26. The specific configuration and/or operation of the fluid cooler 26 is not pertinent to the detailed description, and is therefore not described in detail herein.

The bypass valve assembly 20 controls fluid communication between the transmission 24 and the fluid cooler 26. The bypass valve assembly 20 may be configured in any suitable manner that is capable of closing fluid communication between the transmission 24 and the fluid cooler 26 when a temperature of the transmission fluid is less than a first pre-defined temperature, and opening fluid communication between the transmission 24 and the fluid cooler 26 when the temperature of the transmission fluid is equal to or greater than the first pre-defined temperature. The first pre-defined temperature may be set to any temperature, and is dependent upon the specific system and type of fluid. For example, the first pre-defined temperature for the transmission fluid cooling circuit 22 may be defined approximately equal to 85° C.

An exemplary embodiment of the bypass valve assembly 20 is shown and described herein. However, it should be appreciated that the bypass valve assembly 20 may be configured and operate differently than the exemplary embodiment described herein. Referring to FIGS. 2 through 15, the bypass valve assembly 20 shown and described herein includes a housing 30, which supports a valve member 32. The housing 30 defines a first port 34, a second port 36, a third port 38, a fourth port 40, and a valve chamber 42. The valve member 32 is disposed within the valve chamber 42.

Referring to FIG. 1, the bypass valve assembly 20 is connected to the transmission 24 and the fluid cooler 26 in fluid communication. A transmission outlet line 44 is attached to and disposed in fluid communication with the transmission 24 and the first port 34 of the bypass valve assembly 20 for circulating the transmission fluid from the transmission 24 to the bypass valve assembly 20. A cooler supply line 46 is attached to and disposed in fluid communication with the second port 36 of the bypass valve assembly 20 and the fluid cooler 26 for circulating the transmission fluid from the bypass valve assembly 20 to the fluid cooler 26. A cooler outlet line 48 is attached to and disposed in fluid communication with the fluid cooler 26 and the third port 38 of the bypass valve assembly 20 for circulating the transmission fluid from the fluid cooler 26 to the bypass valve assembly 20. A transmission supply line 50 is attached to and disposed in fluid communication with the fourth port 40 of the bypass valve assembly 20 and the transmission 24 for circulating the transmission fluid from the bypass valve assembly 20 to the transmission 24. While the transmission 24, the bypass valve assembly 20, and the fluid cooler 26 are shown in the figures and described as being connected by the various connecting lines (i.e., the transmission outlet line 44, the cooler supply line 46, the cooler outlet line 48, and the transmission supply line 50), it should be appreciated that one or more of the various connecting lines may be defined by an internal passage in either the fluid cooler 26 and/or the transmission 24. For example, the bypass valve assembly 20 may be mounted to the transmission 24, with the transmission 24 defining the internal passages corresponding to the transmission outlet line 44 and/or the transmission supply line 50.

Referring to FIGS. 2 through 15, the valve member 32 is disposed with in the valve chamber 42 of the housing 30. The valve member 32 includes a first seat 52, and the housing 30 includes a first land 54. The first land 54 is positioned to mate with the first seat 52 in sealing engagement when the valve member 32 is disposed in a first position. The valve member 32 further includes a second seat 56, and the housing 30 further includes a second land 58. The second land 58 is positioned to mate with the second seat 56 in sealing engagement when the valve member 32 is disposed in a second position.

The valve member 32 is moveable between the first position, shown in FIGS. 3, 5, 7, 9, 11, 13, and 15, and the second position, shown in FIGS. 2, 4, 6, 8. FIGS. 10, 12, and 14 show the valve member 32 in a middle position, in-between the first position and the second position. When the valve member 32 is disposed in the first position, the first land 54 is disposed in sealing engagement with the first seat 52 so that the valve member 32 closes fluid communication between the first port 34 and the second port 36 to prevent the transmission fluid from circulating through the transmission fluid cooling circuit 22. Additionally, when the valve member 32 is disposed in the first position, the second land 58 is not disposed in sealing engagement with the second seat 56 so that the valve member 32 opens fluid communication between the first port 34 and the third and fourth ports 38, 40. When the valve member 32 is disposed in the second position, the first land 54 is not disposed in sealing engagement with the first seat 52 so that the valve member 32 connects the first port 34 and the second port 36 in fluid communication to allow the transmission fluid to circulate through the transmission fluid cooling circuit 22. Additionally, when the valve member 32 is disposed in the second position, the second land 58 is disposed in sealing engagement with the second seat 56 so that the valve member 32 closes fluid communication between the first port 34 and the third and fourth ports 38, 40.

The bypass valve assembly 20 includes temperature based actuating mechanism 60 that is coupled to the valve member 32. The temperature based actuating mechanism 60 is operable to position the valve member 32 in the first position when a temperature of the transmission fluid circulating through the housing 30 is equal to or less than the first pre-defined temperature. The temperature based actuating mechanism 60 is operable to position the valve member 32 in the second position when the temperature of the transmission fluid circulating through the housing 30 is greater than the first pre-defined temperature. The temperature based actuator mechanism may include any system capable of moving the valve member 32 between the first position and the second position based on the temperature of the fluid circulating through the bypass valve assembly 20.

In the exemplary embodiment of the bypass valve assembly 20 shown in the Figures and described herein, the temperature based actuating mechanism 60 includes a first biasing device 62 and a second biasing device 68. The first biasing device 62 is operable to bias the valve member 32 in a first direction 64 along a central axis 66. The second biasing device 68 is operable to bias the valve member 32 in a second direction 70 along the central axis 66. The first direction 64 and the second direction 70 are opposite directions along the central axis 66. The first biasing device 62 may include, but is not limited to, an active material that changes or provides two different spring constants, depending upon the temperature of the transmission fluid circulating through the bypass valve assembly 20. For example, the first biasing device 62 may provide a first, higher spring force at temperatures greater than the first pre-defined temperature, and a second lower spring force at temperatures lower than the first pre-defined temperature. The first spring force is sufficient to overcome the spring force provided by the second biasing device 68, and bias the valve member 32 into the second position, in which the second land 58 and the second seat 56 are disposed in sealing engagement. The second spring force is not sufficient to overcome the spring force provided by the second biasing device 68, such that the second biasing device 68 biases the valve member 32 into the first position, in which the first land 54 and the first seat 52 are disposed in sealing engagement.

The bypass valve assembly 20 further includes a temporary flow control device 72. The temporary flow control device 72 is operable to undergo a one-time only shape change between a first shape and a second shape. The temporary flow control device 72 is operable to enable fluid communication between the first port 34 and the second port 36 when having the first shape, and does not enable fluid communication between the first port 34 and the second port 36 when having the second shape. The temporary flow control device 72 exhibits the first shape when having an initial temperature less than or equal to a second pre-defined temperature, and exhibits the second shape in response to a first heating of the temporary flow control device 72 to a temperature that is greater than the second pre-defined temperature. The second pre-defined temperature may be approximately equal to the first pre-defined temperature, or may be between 10° C. and 20° C. lower than the first pre-defined temperature.

The temporary flow control device 72 may be constructed in any manner that enables a one-time only shape change to initially control the position of the valve member 32, prior to its first heating to a temperature greater than the second pre-defined temperature. In one exemplary embodiment, the flow control device is manufactured from a polymer. The polymer may include, but is not limited to, a shape memory polymer. In the exemplary embodiments depicted herein, the temporary flow control device 72 is a shape memory polymer. However, other active materials may be used within the scope of the disclosure. Suitable active materials include, without limitation, shape memory alloys (SMA), and shape memory polymers (SMP).

Suitable shape memory alloys exhibit a one-way shape memory effect. The two phases that occur in shape memory alloys are often referred to as martensite and austenite phases. The martensite phase is a relatively soft and easily deformable phase of the shape memory alloys, which generally exists at lower temperatures. The austenite phase, the stronger phase of shape memory alloys, occurs at higher temperatures. Shape memory materials formed from shape memory alloy compositions that exhibit one-way shape memory effects do not automatically reform, and depending on the shape memory material design, will likely require an external mechanical force to reform the shape orientation that was previously exhibited.

The temperature at which the shape memory alloy remembers its high temperature form when heated can be adjusted by slight changes in the composition of the alloy and through heat treatment. In nickel-titanium shape memory alloys, for example, it can be changed from above about 100° C. to below about −100° C. The shape recovery process occurs over a range of just a few degrees and the start or finish of the transformation can be controlled to within a degree or two depending on the desired application and alloy composition. The mechanical properties of the shape memory alloy vary greatly over the temperature range spanning their transformation, typically providing the shape memory material with shape memory effects as well as high damping capacity. The inherent high damping capacity of the shape memory alloys can be used to further increase the energy absorbing properties.

Suitable shape memory alloy materials include without limitation nickel-titanium based alloys, indium-titanium based alloys, nickel-aluminum based alloys, nickel-gallium based alloys, copper based alloys (e.g., copper-zinc alloys, copper-aluminum alloys, copper-gold, and copper-tin alloys), gold-cadmium based alloys, silver-cadmium based alloys, indium-cadmium based alloys, manganese-copper based alloys, iron-platinum based alloys, iron-platinum based alloys, iron-palladium based alloys, and the like. The alloys can be binary, ternary, or any higher order so long as the alloy composition exhibits a shape memory effect, e.g., change in shape orientation, damping capacity, and the like. For example, a nickel-titanium based alloy is commercially available under the trademark NITINOL from Shape Memory Applications, Inc.

Other suitable active materials are shape memory polymers. Similar to the behavior of a shape memory alloy, when the temperature is raised through its transition temperature, the shape memory polymer also undergoes a change in shape orientation. Dissimilar to SMAs, raising the temperature through the transition temperature causes a substantial drop in modulus. While SMAs are well suited as actuators, SMPs are better suited as "reverse" actuators. That is, by undergoing a large drop in modulus by heating the SMP past the transition temperature, release of stored energy blocked by the SMP in its low temperature high modulus form can occur. To set the permanent shape of the shape memory polymer, the polymer must be at about or above the Tg or melting point of the hard segment of the polymer. "Segment" refers to a block or sequence of polymer forming part of the shape memory polymer. The shape memory polymers are shaped at the temperature with an applied force followed by cooling to set the permanent shape. The temperature necessary to set the permanent shape is preferably between about 100° C. to about 300° C. Setting the temporary shape of the shape memory polymer requires the shape memory polymer material to be brought to a temperature at or above the Tg or transition temperature of the soft segment, but below the Tg or melting point of the hard segment. At the soft segment transition temperature (also termed "first transition temperature"), the temporary shape of the shape memory polymer is set followed by cooling of the shape memory polymer to lock in the temporary shape. The temporary shape is maintained as long as it remains below the soft segment transition temperature. The permanent shape is regained when the shape memory polymer fibers are once again brought to or above the transition temperature of the soft segment. Repeating the heating, shaping, and cooling steps can reset the temporary shape. The soft segment transition temperature can be chosen for a particular application by modifying the structure and composition of the polymer. Transition temperatures of the soft segment range from about −63° C. to above about 120° C.

Most shape memory polymers exhibit a "one-way" effect, wherein the shape memory polymer exhibits one permanent shape. Upon heating the shape memory polymer above the first transition temperature, the permanent shape is achieved and the shape will not revert back to the temporary shape without the use of outside forces.

Similar to the shape memory alloy materials, the shape memory polymers can be configured in many different forms and shapes. The temperature needed for permanent shape recovery can be set at any temperature between about −63° C. and about 120° C. or above. Engineering the composition and structure of the polymer itself can allow for the choice of a particular temperature for a desired application. A preferred temperature for shape recovery is greater than or equal to about −30° C., more preferably greater than or equal to about 0° C., and most preferably a temperature greater than or equal to about 50° C. Also, a preferred temperature for shape recovery is less than or equal to about 120° C., more preferably less than or equal to about 90° C., and most preferably less than or equal to about 70° C.

Suitable shape memory polymers include thermoplastics, thermosets, interpenetrating networks, semi-interpenetrating networks, or mixed networks. The polymers can be a single polymer or a blend of polymers. The polymers can be linear or branched thermoplastic elastomers with side chains or dendritic structural elements. Suitable polymer components to form a shape memory polymer include, but are not limited to, polyphosphazenes, poly(vinyl alcohols), polyamides, polyester amides, poly(amino acid)s, polyanhydrides, polycarbonates, polyacrylates, polyalkylenes, polyacrylamides, polyalkylene glycols, polyalkylene oxides, polyalkylene terephthalates, polyortho esters, polyvinyl ethers, polyvinyl esters, polyvinyl halides, polyesters, polylactides, polyglycolides, polysiloxanes, polyurethanes, polyethers, polyether amides, polyether esters, and copolymers thereof. Examples of suitable polyacrylates include poly(methyl methacrylate), poly(ethyl methacrylate), ply(butyl methacrylate), poly (isobutyl methacrylate), poly(hexyl methacrylate), poly(isodecyl methacrylate), poly(lauryl methacrylate), poly(phenyl methacrylate), poly(methyl acrylate), poly(isopropyl acrylate), poly(isobutyl acrylate) and poly(octadecyl acrylate). Examples of other suitable polymers include polystyrene, polypropylene, polyvinyl phenol, polyvinylpyrrolidone, chlorinated polybutylene, poly(octadecyl vinyl ether) ethylene vinyl acetate, polyethylene, poly(ethylene oxide)-poly (ethylene terephthalate), polyethylene/nylon (graft copolymer), polycaprolactones-polyamide (block copolymer), poly (caprolactone) dimethacrylate-n-butyl acrylate, poly (norbornyl-polyhedral oligomeric silsequioxane), polyvinylchloride, urethane/butadiene copolymers, polyurethane block copolymers, styrene-butadiene-styrene block copolymers, and the like.

The shape memory polymer or the shape memory alloy, may be activated by any suitable means, preferably a means for subjecting the material to a temperature change above, or below, a transition temperature. For example, for elevated temperatures, heat may be supplied using hot gas (e.g., air), steam, hot liquid, or electrical current. The activation means may, for example, be in the form of heat conduction from a heated element in contact with the shape memory material, heat convection from a heated conduit in proximity to the thermally active shape memory material, a hot air blower or jet, microwave interaction, resistive heating, and the like. In the case of a temperature drop, heat may be extracted by using cold gas, or evaporation of a refrigerant. The activation means may, for example, be in the form of a cool room or enclosure, a cooling probe having a cooled tip, a control signal to a thermoelectric unit, a cold air blower or jet, or means for introducing a refrigerant (such as liquid nitrogen) to at least the vicinity of the shape memory material.

Figure 2:
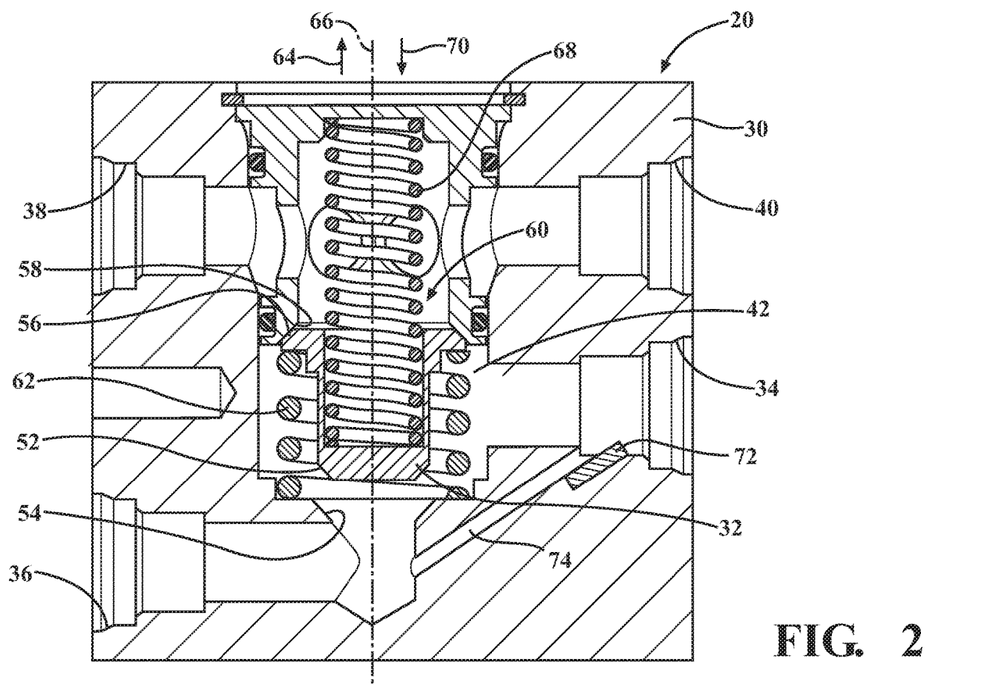
FIG. 2 is a schematic cross sectional view of a first embodiment of the fluid bypass valve showing a temporary flow control device in a first shape.
Figure 3:
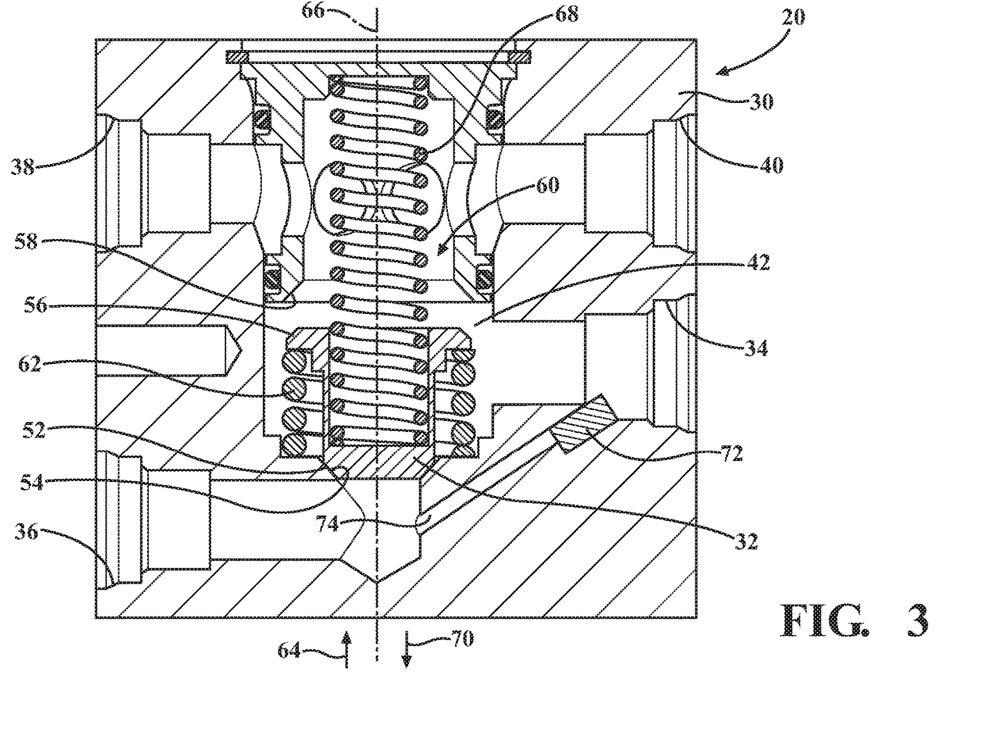
FIG. 3 is a schematic cross sectional view of the first embodiment of the fluid bypass valve showing the temporary flow control device in a second shape.

Referring to FIGS. 2 and 3, a first exemplary embodiment of the fluid bypass valve is generally shown. The housing 30 includes a bypass passage 74 that interconnects the first port 34 and the second port 36 in fluid communication. The temporary flow control device 72 is disposed within the bypass passage 74. When the temporary flow control device 72 exhibits the first shape, the temporary flow control device 72 allows fluid flow through the bypass passage 74. When the temporary flow control device 72 exhibits the second shape, the temporary flow control device 72 blocks fluid flow through the bypass passage 74. Accordingly, the temporary flow control device 72 includes a first shape that does not completely block the bypass passage 74, thereby allowing the transmission fluid through the bypass passage 74. Upon being heated to the second pre-defined temperature for the first time, the temporary flow control device 72 transforms or changes from the first shape to the second shape. When in the second shape, the temporary flow control device 72 completely blocks the bypass passage 74, and prevents fluid flow through the bypass passage 74.

In the exemplary embodiments of the fluid bypass valve shown in FIGS. 4-15, the temporary flow control device 72 is configured to interfere with one of the valve member 32 or the temperature based actuating mechanism 60, when the temporary flow control device 72 exhibits the first shape. The interference from the temporary flow control device 72 positions the valve member 32 in a position other than the first position, i.e., in either the second position or a middle position between the first position and the second position, in which the first land 54 is spaced from the first seat 52 to allow fluid communication between the first port 34 and the second port 36. The interference from the temporary flow control device 72 prevents movement of the valve member 32 into the first position, until after the temporary flow control device 72 has changed shape and exhibits the second shape.

In the exemplary embodiments shown in FIGS. 4-9, when the temporary flow control device 72 exhibits the first shape, the temporary flow control device 72 interferes with the operating position of the temperature based actuating mechanism 60. When the temporary flow control device 72 exhibits the second shape, the temporary flow control device 72 does not interfere with the operating position of the temperature based actuating mechanism 60. When the temporary flow control device 72 exhibits the first shape, the temporary flow control device 72 spaces the first biasing device 62 in the first direction 64 along the central axis 66, relative to a datum. The datum may be defined as any reference plane or surface along the central axis 66, such as but not limited to, the first seat 52 of the housing 30. When the temporary flow control device 72 exhibits the second shape, the temporary flow control device 72 does not space the first biasing device 62 relative to the datum.

Figure 4:
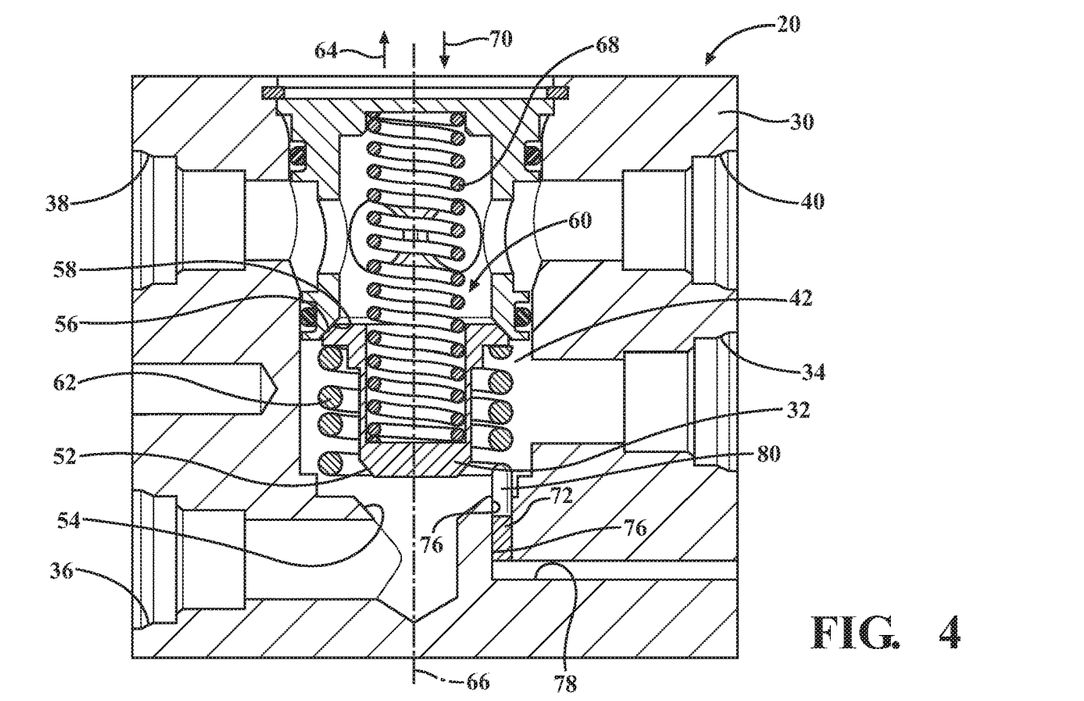
FIG. 4 is a schematic cross sectional view of a second embodiment of the fluid bypass valve showing a valve member in an open position and the temporary flow control device in the first shape.
Figure 5:
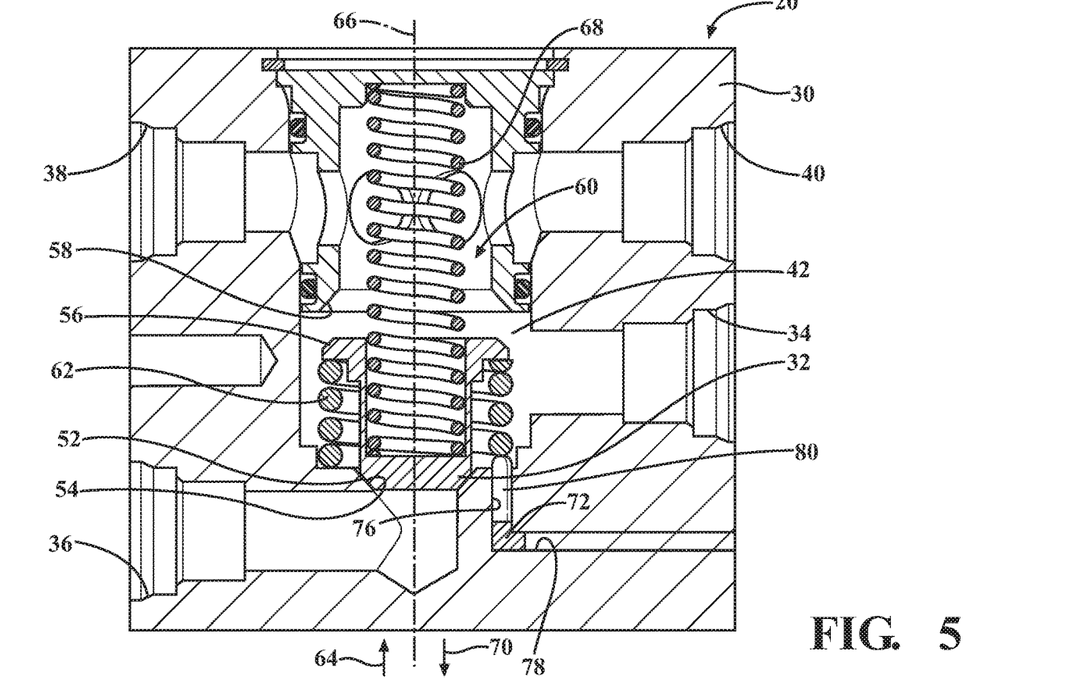
FIG. 5 is a schematic cross sectional view of the second embodiment of the fluid bypass valve showing the valve member in a closed position and the temporary flow control device in the second shape.

Referring to FIGS. 4-5, a second exemplary embodiment of the fluid bypass valve is generally shown. As shown in FIGS. 4-5, the housing 30 defines a first bore 76 and a second bore 78 intersecting the first bore 76. The second bore 78 is positioned to form an angle between the first bore 76 and the second bore 78. A spacer 80 is slideably disposed within the first bore 76. The spacer 80 may include, but is not limited to, a straightened end or leg portion of the first biasing device 62, which extends from the valve chamber 42 into the first bore 76.

As shown in FIG. 4, the temporary flow control device 72 is positioned within the first bore 76. When the temporary flow control device 72 exhibits the first shape, the temporary flow control device 72 positions the spacer 80 within the first bore 76 to interfere with the normal position of the first biasing device 62, thereby preventing the second biasing device 68 from biasing the valve member 32 into the first position. In other words, when the temporary flow control device 72 exhibits the first shape, the spacer 80 compresses the first biasing device 62 and prevents the second biasing device 68 from expanding, thereby positioning the valve member 32 in the second position. As shown in FIG. 5, when the temporary flow control device 72 exhibits the second shape, the spacer 80 does not interfere with the normal operating position of the first biasing device 62. When the temporary flow control device 72 exhibits the second shape, the temporary flow control device 72 is pressed downward toward a bottom of the first bore 76 and at least partially into the second bore 78, so that the spacer 80 no longer interferes with the normal operating position of the first biasing device 62.

Figure 6:
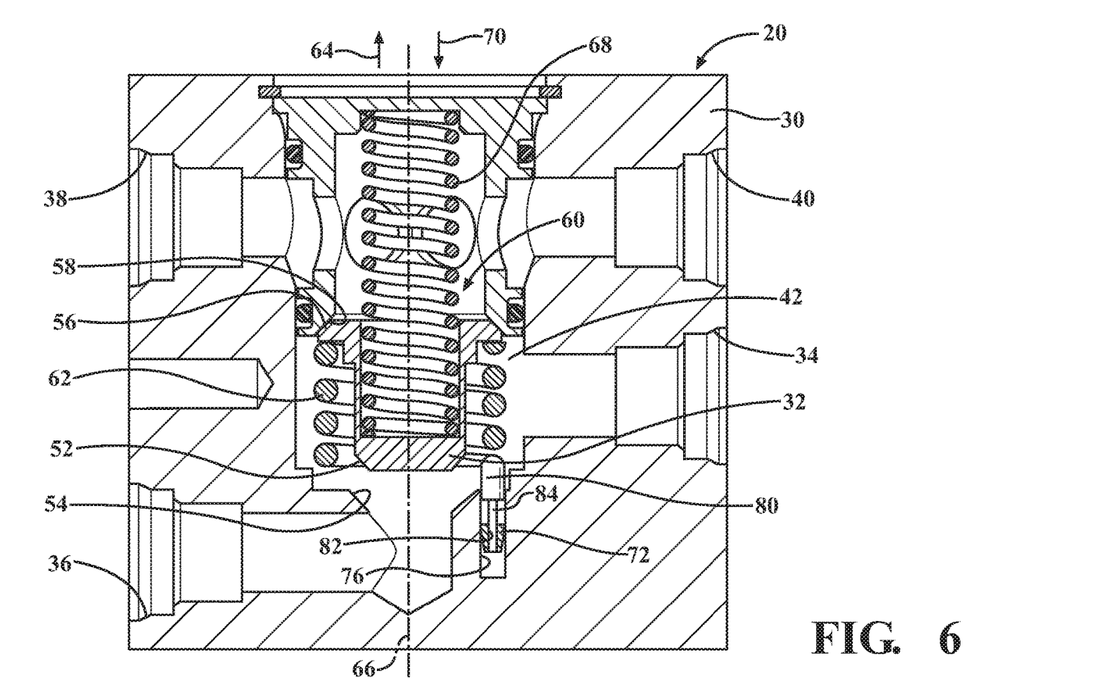
FIG. 6 is a schematic cross sectional view of a third embodiment of the fluid bypass valve showing the valve member in the open position and the temporary flow control device in the first shape.
Figure 7:
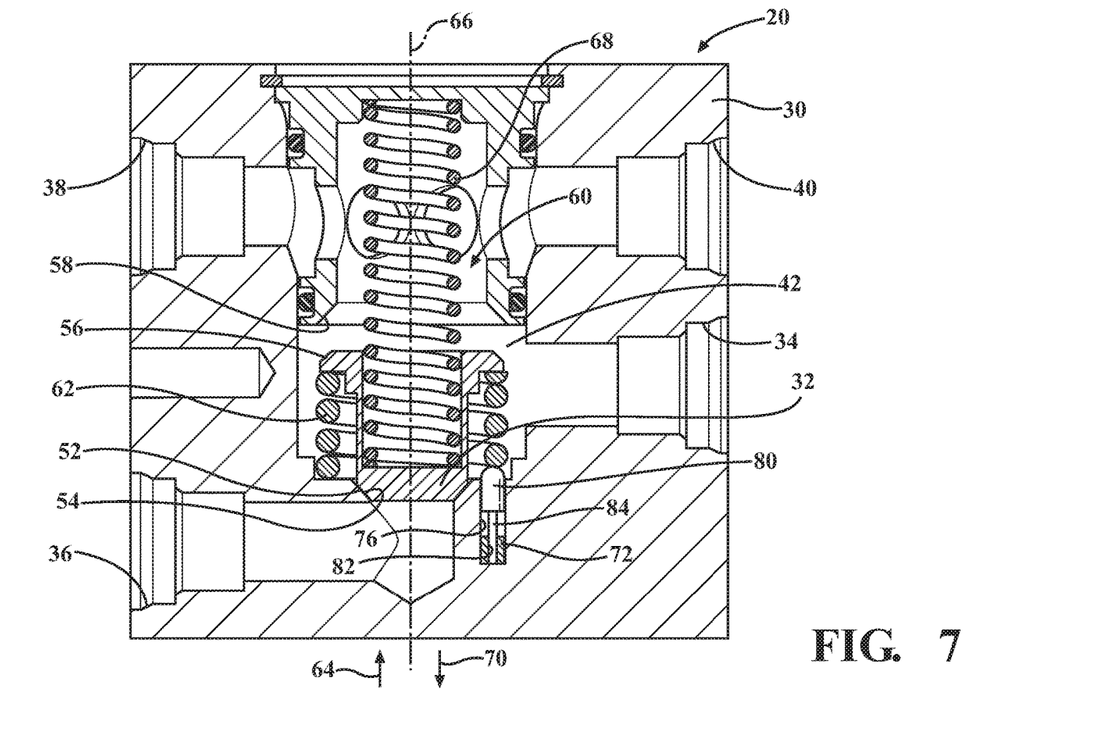
FIG. 7 is a schematic cross sectional view of the third embodiment of the fluid bypass valve showing the valve member in the closed position and the temporary flow control device in the second shape.

Referring to FIGS. 6-7, a third exemplary embodiment of the fluid bypass valve is generally shown. As shown in FIGS. 6-7, the housing 30 defines a first bore 76. A spacer 80 is slideably disposed within the first bore 76. The spacer 80 may include, but is not limited to, a straightened end or leg portion of the first biasing device 62, which extends from the valve chamber 42 into the first bore 76. The spacer 80 includes a shaft portion 84 extending downward, deeper into the first bore 76. The temporary flow control device 72 is positioned within the first bore 76, and includes a central aperture 82 aligned with the shaft portion 84 of the spacer 80. However, when the temporary flow control device 72 exhibits the first shape, the shaft portion 84 is unable to pass through the central aperture 82 of the temporary flow control device 72.

As shown in FIG. 6, when the temporary flow control device 72 exhibits the first shape, the temporary flow control device 72 positions the spacer 80 within the first bore 76 so that the spacer 80 interferes with a position of the first biasing device 62, and prevents the second biasing device 68 from biasing the valve member 32 into the first position. In other words, when the temporary flow control device 72 exhibits the first shape, the temporary flow control device 72 positions the spacer 80 to compress the first biasing device 62 and prevent the second biasing device 68 from expanding, thereby positioning the valve member 32 in the second position. As shown in FIG. 7, when the temporary flow control device 72 exhibits the second shape, the shaft portion 84 of the spacer 80 is able to pass through the central aperture 82 of the temporary flow control device 72 and push the temporary flow control device 72 deeper into the first bore 76, until the spacer 80 no longer interferes with the position of the first biasing device 62. When the temporary flow control device 72 exhibits the second shape, the temporary flow control device 72 is pressed downward toward a bottom of the first bore 76.

Figure 8:
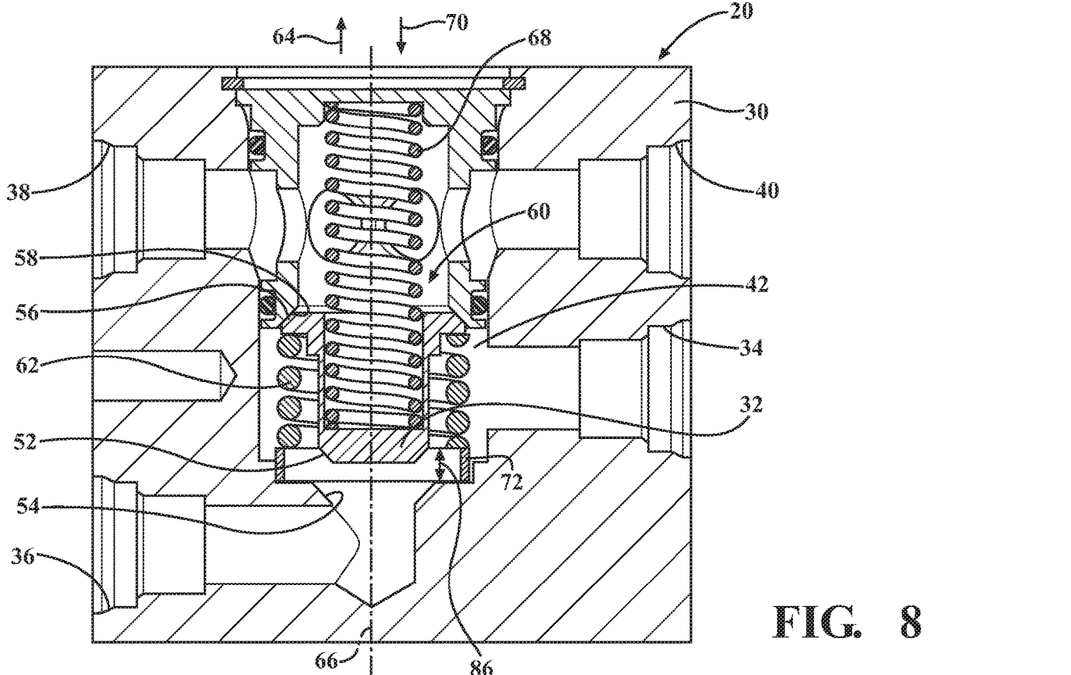
FIG. 8 is a schematic cross sectional view of a fourth embodiment of the fluid bypass valve showing the valve member in the open position and the temporary flow control device in the first shape.
Figure 9:
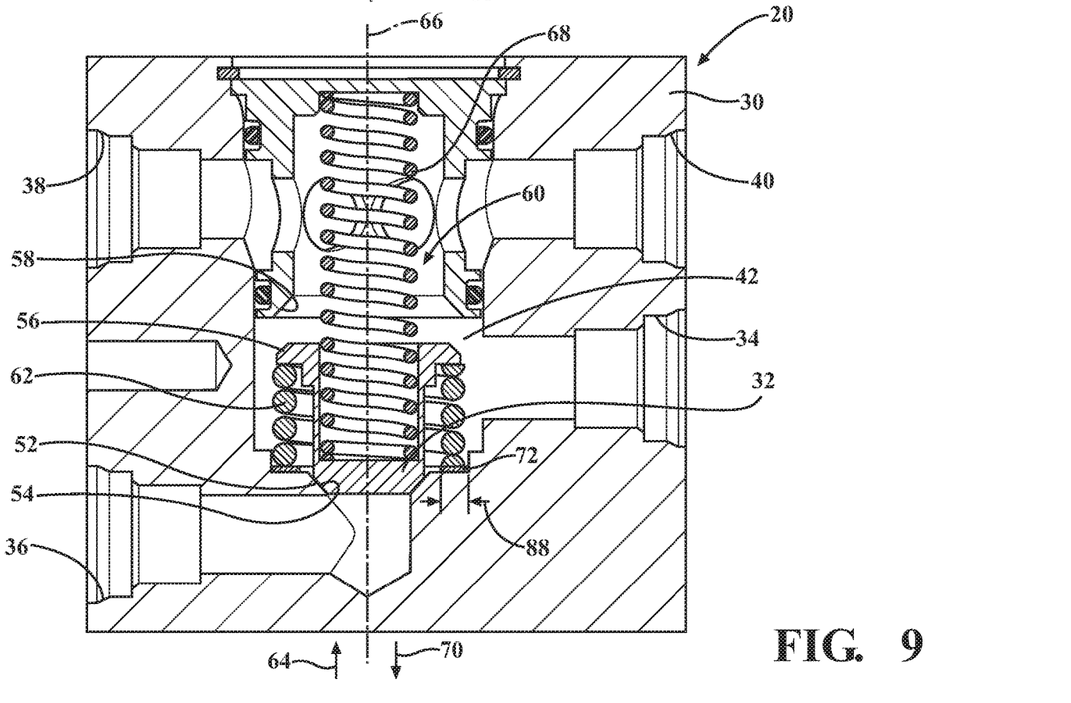
FIG. 9 is a schematic cross sectional view of the fourth embodiment of the fluid bypass valve showing the valve member in the closed position and the temporary flow control device in the second shape.
Figure 10:
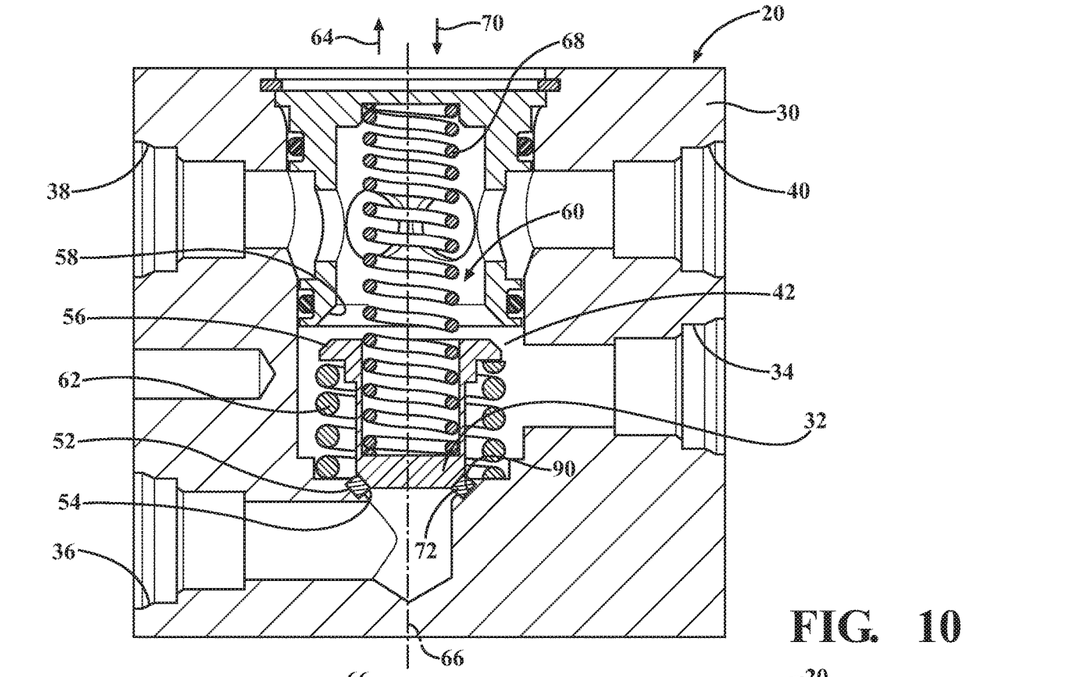
FIG. 10 is a schematic cross sectional view of a fifth embodiment of the fluid bypass valve showing the valve member in the open position and the temporary flow control device in the first shape.

Referring to FIGS. 8-9, a fourth exemplary embodiment of the fluid bypass valve is generally shown. As shown in FIGS. 8-9, the temporary flow control device 72 is formed as an annular ring, and is positioned between the lower axial end of the first biasing device 62 and the housing 30. As shown in FIG. 8, when the temporary flow control device 72 exhibits the first shape, the annular ring of the temporary flow control device 72 includes a longer axial length 86 along the central axis 66 relative to a radial width 88 from the central axis 66. This long axial length 86 of the temporary flow control device 72 compresses the first biasing device 62 and prevents the second biasing device 68 from urging the valve member 32 into the first position. As shown in FIG. 9, when the temporary flow control device 72 exhibits the second shape, the annular ring of the temporary flow control device 72 includes a shorter axial length along the central axis 66 relative to the radial width 88 from the central axis 66. This shorter axial length of the temporary flow control device 72 does not interfere with the first biasing device 62, thereby allowing the second biasing device 68 to urge the valve member 32 downward into its normal operating position.

In the exemplary embodiments shown in FIGS. 10-15, when the temporary flow control device 72 exhibits the first shape, the temporary flow control device 72 interferes with the position of the valve member 32. When the temporary flow control device 72 exhibits the second shape, the temporary flow control device 72 does not interfere with the position of the valve member 32. When the temporary flow control device 72 exhibits the first shape, the temporary flow control device 72 spaces the valve member 32 in the first direction 64 along the central axis 66, so that the first land 54 is spaced from the first seat 52, and prevents the second biasing device 68 from moving the valve member 32 into the first position. When the temporary flow control device 72 exhibits the second shape, the temporary flow control device 72 does not space the first land 54 from the first seat 52, thereby allowing the second biasing device 68 to move the valve member 32 into the first position.

Figure 11:
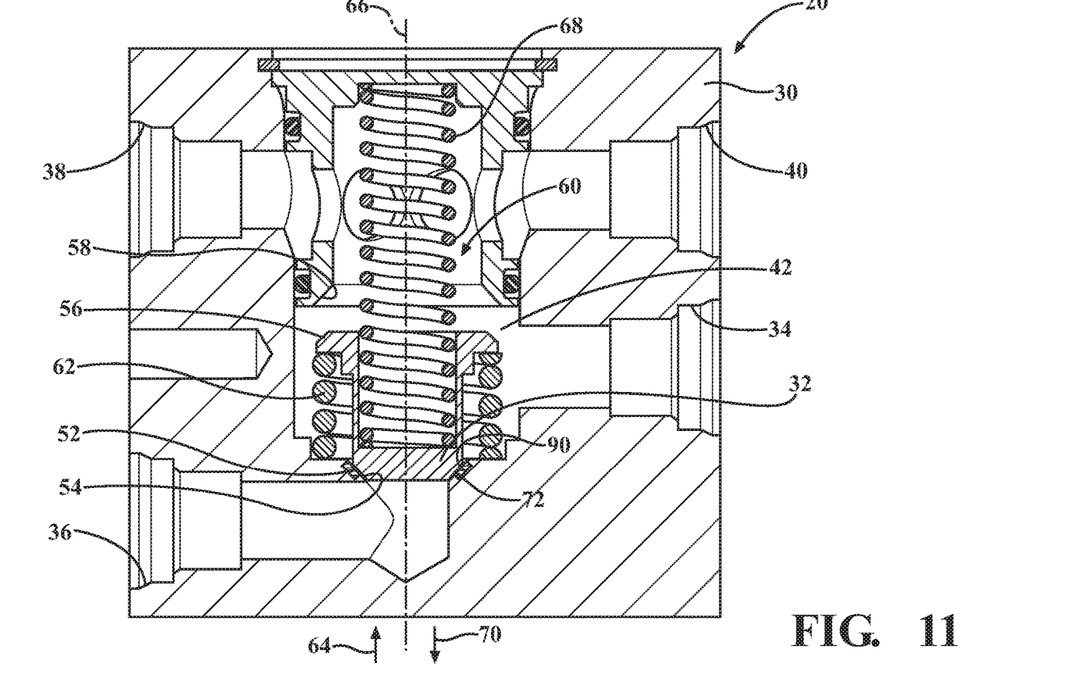
FIG. 11 is a schematic cross sectional view of the fifth embodiment of the fluid bypass valve showing the valve member in the closed position and the temporary flow control device in the second shape.
Figure 12:
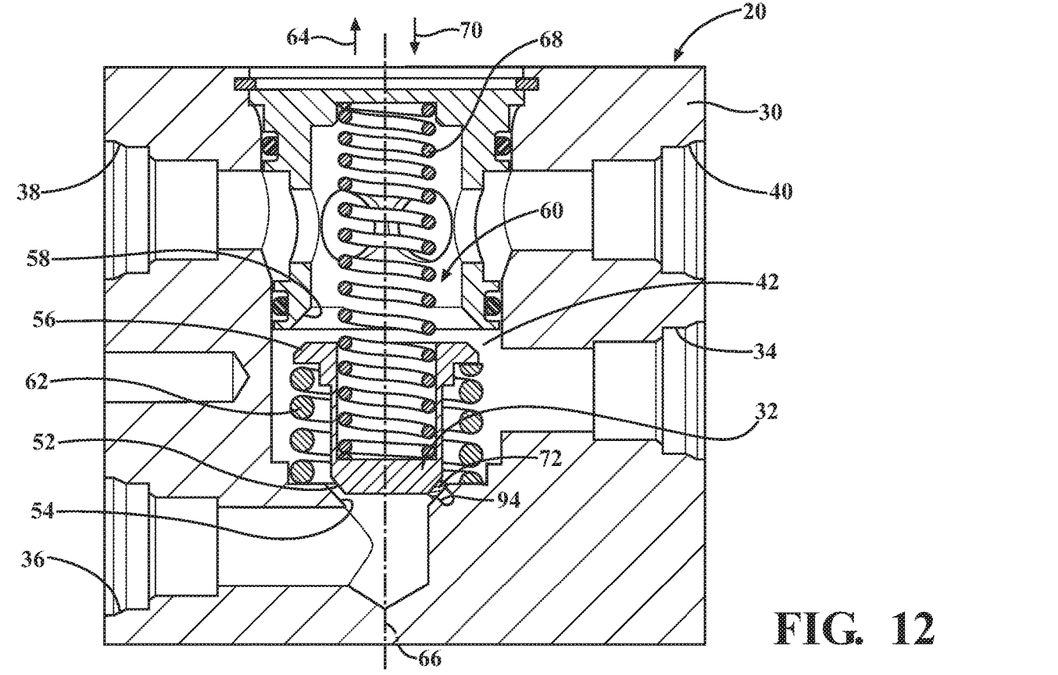
FIG. 12 is a schematic cross sectional view of a sixth embodiment of the fluid bypass valve showing the valve member in the open position and the temporary flow control device in the first shape.
Figure 16:
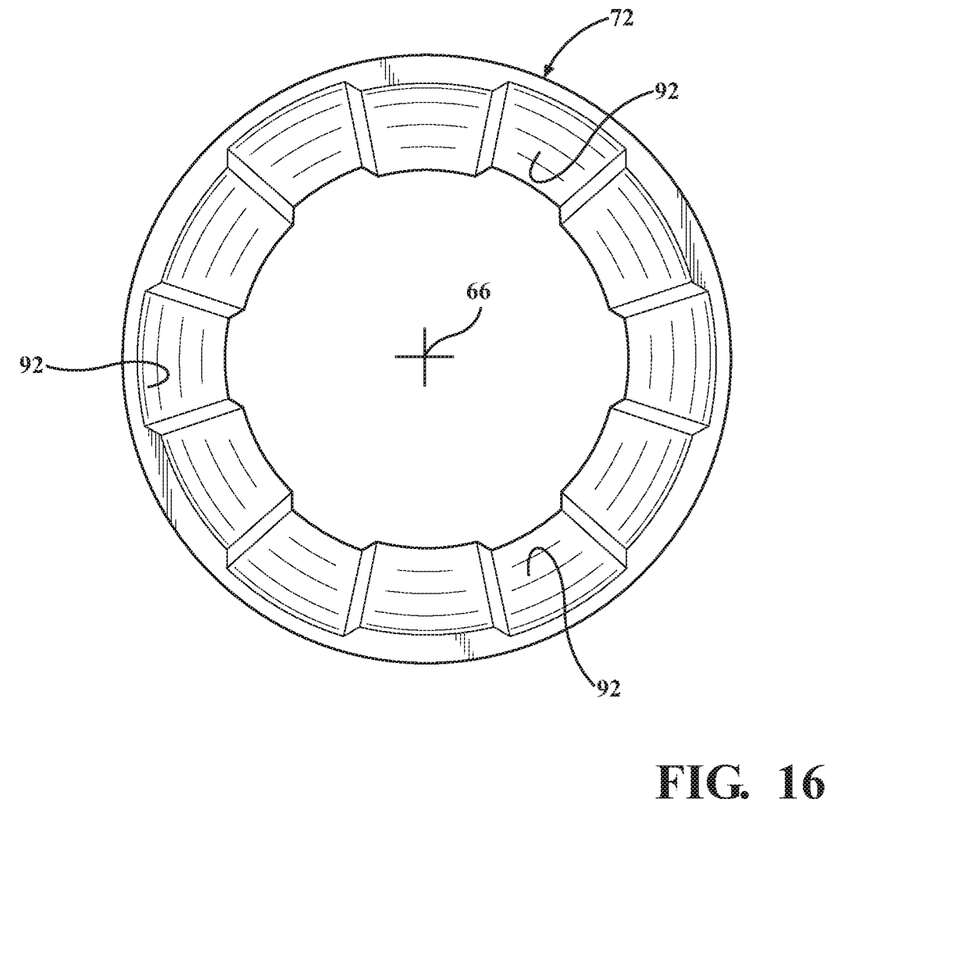
FIG. 16 is a schematic plan view of the temporary flow control device of the fifth embodiment of the fluid bypass valve shown in FIG. 10.

Referring to FIGS. 10-11, a fifth exemplary embodiment of the fluid bypass valve is generally shown. As shown in FIGS. 10-11, the temporary flow control device 72 forms an annular ring positioned within an annular groove 90 formed in the housing 30. The temporary flow control device 72 is generally disposed between the first seat 52 and the first land 54. The annular ring of the temporary flow control device 72 is formed to allow fluid flow across a face of the temporary flow control device 72, or through a passage defined by the temporary flow control device 72. For example, referring to FIG. 16, the temporary flow control device 72 may include one or more grooves 92 extending along the central axis 66, in order to allow fluid communication between the valve chamber 42 and the second port 36.

As shown in FIG. 10, when the temporary flow control device 72 exhibits the first shape, the temporary flow control device 72 prevents the first seat 52 from engaging the first land 54 in sealing engagement. The grooves 92 in the temporary flow control device 72 allow fluid communication between the first port 34 and the second port 36. As shown in FIG. 11, when the temporary flow control device 72 exhibits the second shape, the temporary flow control device 72 is squeezed to a very thin ring, and is positioned within the annular groove 90 of the housing 30, so that the first land 54 and the first seat 52 may engage each other in sealing engagement. Additionally, it should be appreciated that the temporary flow control device 72 may form at least a portion of the sealing surface, i.e., a part of the first land 54, when exhibiting the second shape.

Figure 13:
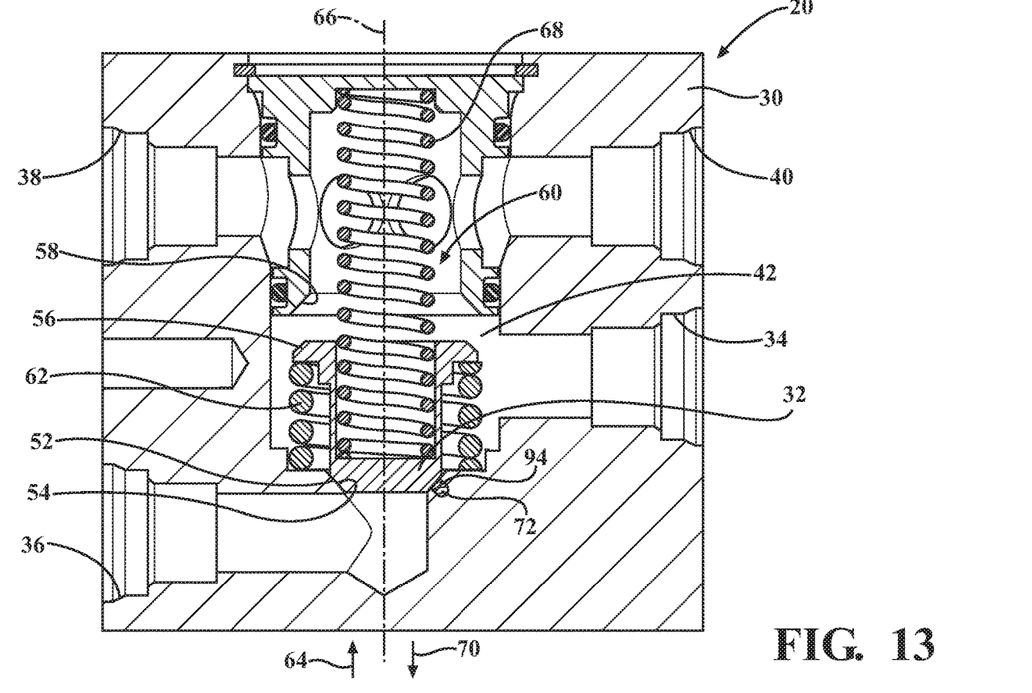
FIG. 13 is a schematic cross sectional view of the sixth embodiment of the fluid bypass valve showing the valve member in the closed position and the temporary flow control device in the second shape.
Figure 14:
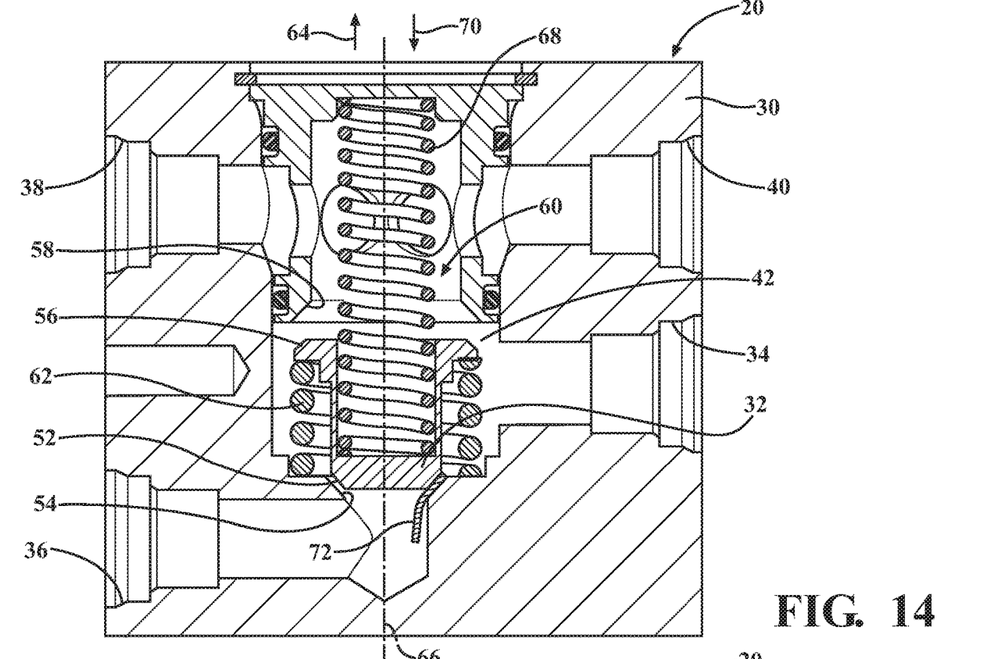
FIG. 14 is a schematic cross sectional view of a seventh embodiment of the fluid bypass valve showing the valve member in the open position and the temporary flow control device in the first shape.

Referring to FIGS. 12-13, a sixth exemplary embodiment of the fluid bypass valve is generally shown. As shown in FIGS. 12-13, the housing 30 is formed to include a recess 94 in the first land 54, and the temporary flow control device 72 is formed into a plate. As shown in FIG. 12, when the temporary flow control device 72 exhibits the first shape, the temporary flow control device 72 is disposed between the first land 54 and the first seat 52, and is positioned over the recess 94 in the first land 54. This prevents the first seat 52 from sealing against the first land 54. As shown in FIG. 13, when the temporary flow control device 72 exhibits the second shape, the temporary flow control device 72 is compressed into the recess 94 in the first land 54, so that the temporary flow control device 72 no longer interferes with the position of the valve member 32, and the first land 54 and the first seat 52 may engage each other in sealing engagement.

Figure 15:
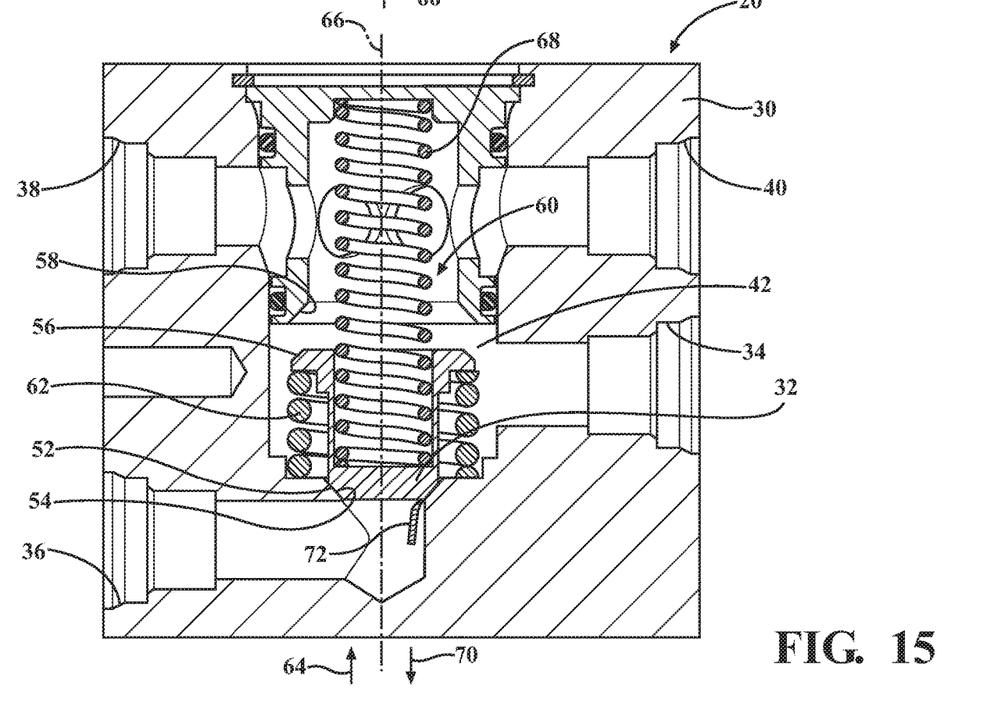
FIG. 15 is a schematic cross sectional view of the seventh embodiment of the fluid bypass valve showing the valve member in the closed position and the temporary flow control device in the second shape.

Referring to FIGS. 14-15, a seventh exemplary embodiment of the fluid bypass valve is generally shown. As shown in FIG. 14, when the temporary flow control device 72 exhibits the first shape, the temporary flow control device 72 is formed to include a strip, and is disposed between the first land 54 and the first seat 52, thereby spacing the first land 54 from the first seat 52 and preventing the valve member 32 from being positioned in the first position. As shown in FIG. 15, when the temporary flow control device 72 exhibits the second shape, the temporary flow control device 72 con-tracts or shrinks out of the interference position, so that the temporary flow control device 72 is no longer positioned between the first land 54 and the first seat 52, thereby allowing the valve member 32 into the first position.

The detailed description and the drawings or figures are supportive and descriptive of the disclosure, but the scope of the disclosure is defined solely by the claims. While some of the best modes and other embodiments for carrying out the claimed teachings have been described in detail, various alternative designs and embodiments exist for practicing the disclosure defined in the appended claims.

What is claimed is:

1. A fluid bypass valve comprising:
    a housing comprising:
        a first port connectable to a transmission outlet line,
        a second port connectable to a transmission cooler supply line,
        a third port connectable to a transmission cooler outlet line;
        a fourth port connectable to a transmission supply line, and
        a valve chamber comprising a cavity in fluid communication with the first port, the second port, the third port, and the fourth port;
    a moveable valve member configured to be moveable to a first position in which transmission fluid is prevented from circulating through the second port, and a second position in which fluid is allowed to circulate past the moveable valve member through the second port, with the permission or prevention of circulation being accomplished by selective sealing of the moveable valve member against the housing;
    a temperature based actuating pair of springs operably coupled to the moveable valve member such that the temperature based actuating pair of springs is operable to exert upon the valve member a first set of spring forces in response to a temperature of transmission fluid within the valve chamber being less than a first pre-predefined temperature, wherein the exertion upon the moveable valve member of the first set of spring forces results in the moveable valve member being positioned in the first position, and operable to exert upon the valve member a second set of spring forces in response to the temperature of the transmission fluid within the valve chamber being greater than the first pre-defined temperature, wherein the exertion upon the moveable valve member of the second set of spring forces results in the moveable valve member being positioned in the second position, and
    a shape memory flow control device configured to change from an initial shape that enables fluid communication between the first port to the second port when the temperature of the transmission fluid within the valve chamber is less than a second pre-defined temperature to a second shape that ceases to enable the fluid communication between the first port and the second port in response to the temperature of the transmission fluid within the valve chamber being heated by an initial heating event to a temperature greater than the second pre-defined temperature.

2. The fluid bypass valve set forth in claim 1, wherein the housing includes a bypass passage interconnecting the first port and the second port in fluid communication.

3. The fluid bypass valve set forth in claim 2, wherein the shape memory flow control device is disposed within the bypass passage.

4. The fluid bypass valve set forth in claim 3, wherein the shape memory flow control device allows fluid flow through the bypass passage when the shape memory flow control device exhibits the initial shape, and wherein the shape memory flow control device blocks fluid flow through the bypass passage when the shape memory flow control device exhibits the second shape.

5. The fluid bypass valve set forth in claim 1, wherein the shape memory flow control device in the initial shape is configured to prevent the valve member from sealing against the mating surfaces of the housing when the valve member is in the first position.

6. The fluid bypass valve set forth in claim 5, wherein shape memory flow control device in the second shape is configured to move in relation to the housing such that the shape memory flow control device cannot subsequently return to the initial shape.

7. The fluid bypass valve set forth in claim 5, wherein the shape memory control device in the second shape is configured to permanently deform from the initial shape.

8. The fluid bypass valve set forth in claim 1, wherein the shape memory flow control device includes a shape memory alloy.

9. The fluid bypass valve set forth in claim 8, wherein the shape memory flow control device includes a shape memory polymer.

10. The fluid bypass valve set forth in claim 1, wherein the shape memory flow control device is constructed with a material exhibiting a one-way shape memory effect.

* * * * *